(12) United States Patent
Chiu et al.

(10) Patent No.: US 9,052,410 B2
(45) Date of Patent: Jun. 9, 2015

(54) MULTIPLE SEISMIC SIGNAL INVERSION

(75) Inventors: Stephen K. Chiu, Katy, TX (US); Joel D. Brewer, Houston, TX (US); Peter M. Eick, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 729 days.

(21) Appl. No.: 12/704,266

(22) Filed: Feb. 11, 2010

(65) Prior Publication Data
US 2010/0208554 A1 Aug. 19, 2010

Related U.S. Application Data

(60) Provisional application No. 61/152,031, filed on Feb. 12, 2009.

(51) Int. Cl.
| | |
|---|---|
| *G01V 1/28* | (2006.01) |
| *G01V 1/36* | (2006.01) |
| *G01V 1/38* | (2006.01) |
| *G01K 11/00* | (2006.01) |

(52) U.S. Cl.
CPC . *G01V 1/362* (2013.01); *G01V 1/38* (2013.01)

(58) Field of Classification Search
CPC ................................. G01V 1/38; G01V 1/362
USPC ........... 114/72; 181/111, 112; 367/20, 41, 56; 702/17
See application file for complete search history.

(56) References Cited

U.S. PATENT DOCUMENTS

| | | | | |
|---|---|---|---|---|
| 6,028,818 | A * | 2/2000 | Jeffryes | 367/20 |
| 6,545,944 | B2 * | 4/2003 | de Kok | 367/56 |
| 6,791,901 | B1 * | 9/2004 | Robertsson et al. | 367/58 |
| 2006/0164916 | A1 * | 7/2006 | Krohn et al. | 367/41 |

FOREIGN PATENT DOCUMENTS

WO    WO 2005073758 A1 *  8/2005

* cited by examiner

*Primary Examiner* — Daniel L Murphy
(74) *Attorney, Agent, or Firm* — ConocoPhillips Company (57) ABSTRACT

The invention relates to methods and equipment for acquiring and processing marine seismic data are disclosed that correct source movement during inversion. By correcting source movement during inversion, multiple data sets may be acquired independently during overlapping time periods thus reducing the number of sweeps required, generating greater amounts of data, and simplifying data processing.

4 Claims, 7 Drawing Sheets

V1R1 SWEEP 1

V2R2 SWEEP 2

V3R3 SWEEP 3

Output Data

Figure 4

|       | P5   | P4   | P3   | P2   | P1   |
|-------|------|------|------|------|------|
| SWEEP 1 | 0    | 0    | V1R1 | V2R2 | V3R3 |
| SWEEP 2 | 0    | V1R1 | V2R2 | V3R3 | 0    |
| SWEEP 3 | V1R1 | V2R2 | V3R3 | 0    | 0    |

MULTIPLE SEISMIC SIGNAL INVERSION

CROSS-REFERENCE TO RELATED APPLICATIONS

This application is a non-provisional application which claims benefit under 35 USC §119(e) to U.S. Provisional Application Ser. No. 61/152,031 filed Feb. 12, 2009, entitled "Multiple Seismic Signal Inversion," which is incorporated herein in its entirety.

STATEMENT REGARDING FEDERALLY SPONSORED RESEARCH OR DEVELOPMENT

None.

FIELD OF THE INVENTION

The present disclosure generally relates to methods and apparatus for improving the range and resolution of simultaneous multiple vibratory source seismic system (ZENSEIS™ Seismic).

BACKGROUND OF THE INVENTION

Multiple source vibrator technology has been used in land-based seismic surveys for years, and its advantages are well documented. Conventional land-based seismic assays employ multiple, simultaneously energized seismic sources (e.g., trucks with vibrating baseplates) to impart vibratory energy into the ground. The imparted vibratory energy travels through the ground, is reflected and/or refracted by various discontinuities in the ground, and the reflected vibratory energy is detected by multiple seismic receivers (e.g., geophones) that are located on the ground at a distance from the seismic sources. The reflected vibratory energy recorded by the receivers is a composite reading representing the reflected energy originating from all the seismic sources. An important step in conventional multiple source vibrator technology is "source separation" of the composite data into discrete source specific data (ie: a "shot record").

In order to allow for source separation, conventional multiple source vibrator technology requires multiple sweeps to be performed while the seismic sources maintain a fixed location. According to conventional multiple source vibrator technology, the number of sweeps performed at a fixed source location must be equal to or greater than the number of sources sought to be separated. For example, if four seismic sources are being used in a conventional multiple source vibrator acquisition scheme, at least four sweeps must be carried out for each source set-up. In addition, conventional multiple source vibrator technology requires uniquely encoded (e.g., phase, frequency, and/or amplitude encoded) vibratory energy for each sweep, so that source separation of the resulting composite data can be performed.

Marine data are traditionally collected using multiple airgun sources with multiple streamers of receivers. Multiple sources mean flip-flop shooting, decreased fold, aliased multiples and other undesirable acquisition patterns. Multiple streamers mean increased minimum-offset for some bins and increased noise from the diverging side wings for other bins. Single-source multi-streamer acquisitions offer much better sampling, but with such low productivity (in terms of square kilometers acquired per day) that 3D acquisition costs become prohibitive.

Multiple vibratory sources are often required to improve acquisition efficiency and to provide enough power to transmit a signal through water and into the geological structures below. Simultaneous-multiple-source-land acquisition including ZENSEIS™ Seismic has increased field-acquisition efficiency and improved spatial resolution of land-based seismic images. The conventional ZENSEIS™ Seismic acquisition technique requires multiple sources and receivers to remain at the same locations for a number of repeated sweeps. However, marine acquisition using multiple vibratory sources violates this assumption, as both sources and receivers are moving during the sweep. Since the sources and receivers do not remain in a fixed location during the complete frequency sweep the inversion formulation used in the land case for source separations simply does not work for multiple source marine seismic studies.

Multiple methods have been proposed to use vibrational sources for marine seismic studies. Landrum, U.S. Pat. No. 4,715,020, stacks multiple data and depends upon phase correlation to enhance the desired signal and cancel vibratory signals from other sources. Sallas, et al., U.S. Pat. No. 5,721,710, activate multiple vibratory sources simultaneously with encoded signals between the sources and the sweeps but require the source and receiver to be fixed. Jeffryes, U.S. Pat. No. 6,028,818, uses exact positioning to align an odd number of vibratory sources during multiple sweep cycles where at least one of the sources generate a different phase angle signal. U.S. Pat. No. 6,049,507, Allen, describes a process for correcting source motion independently from the correction for receiver motion where each data point is corrected for source/receiver motion independently. Barr and Dragoset, U.S. Pat. No. 6,161,076, use a recorded Doppler shift to correct reflected marine data. De Kok, U.S. Pat. No. 6,545,944, describes several simultaneous source separation techniques applicable to either marine or land environments including source signals coded with positive and negative polarities that are not restricted to stationary locations, and source signals with time-delays between source activation times. In U.S. Pat. No. 6,754,590, Moldoveanu uses simultaneous overlapping vibratory sources and stacking of common midpoint data to process data. Krohn and Johnson, US2006164916, simultaneously operate multiple seismic vibrators using continuous sweeps with little or no listening time between sweeps for each vibrator, and recover the separated seismic responses for each vibrator with the earth signature removed.

Proper source separation is required while both vibrator sources and receivers are moving during the sweep. Although some of the above references account for movement of the source, receiver, or both, unfortunately, none of the above references provide unique source separations. What are required are unique source separations that can be obtained in simultaneous-multiple-source marine acquisition. Individual, non-synchronized source data must be retrieved by incorporating better constraints to produce unique source separation.

BRIEF SUMMARY OF THE DISCLOSURE

The invention more particularly includes a method of recording multiple marine seismic signals including deploying two or more independent phase encoded vibrational seismic sources, and three or more seismic receivers to be towed by a boat such that, while in motion, multiple simultaneous sweep signals are transmitted from the independent phase encoded seismic sources. Multiple simultaneous phase encoded seismic signals are received by the receivers and recorded while in motion and the independent phase encoded seismic signals are separated and stacked during inversion of the recorded seismic signals.

The method further includes sources that are spaced at a substantially common distance from one another, the receivers are spaced the same substantially common distance from one another and the points at which the sweeps are intitated are spaced at the same substantially common distance from one another.

In another aspect of the present invention, the method includes at least two streamers of receivers that are laterally offset from one another to acquire three dimensional seismic data.

In an additional aspect of the present invention, the signals are separated at each receiver into separate source specific signals. These source receiver pair signals are then stacked based on substantially common locations of the respective sources and receivers at the time of the respective sweeps so as to correct for the motion of the sources, receivers and common mid points.

It is an additional aspect of the present invention to provide a system for recording multiple marine seismic signals where two or more independent phase encoded vibrational seismic sweep sources are configured to be towed by a boat along with two or more seismic receivers. The two or more independent phase encoded sources transmit multiple simultaneous signals, and the independent phase encoded source receiver signals are separated and stacked during inversion of the recorded seismic signals.

In an additional aspect of the present invention, the system is arranged to have sources that are spaced at a substantially common distance from one another, receivers that are spaced the same substantially common distance from one another and to conduct surveys where the points at which the sweeps are initiated are spaced at the same substantially common distance from one another.

In one embodiment the system includes at least two streamers of receivers that are laterally offset from one another.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Prior studies by Chiu, et al., (U.S. Pat. No. 7,295,490, incorporated herein by reference) use eigenvalue structure to optimize phase encoding for multiple vibrational sources during a seismic survey. Brewer and Eick, (U.S. Ser. No. 12/167, 683, incorporated by reference) flare the seismic streamers with receivers to reduce the number of infill passes required and cover a larger area in fewer sweeps. Chiu, et al. (U.S. Ser. No. 61/109,403, incorporated herein by reference) use periodic marine seismic sweeps, at different locations to simultaneously excite a plurality of seismic sources, record composite reflected/refracted seismic signals, reorganize based on common source-receiver centerpoints, and convert the common centerpoint data using standard techniques. These techniques may be used to optimize phase encoding, reduce the number of sweeps required, and bin seismic data based on common centerpoint.

Energy sources or "source" include simultaneous multiple sources (SMS), ZENSEIS™ Seismic, vibroseis, seismic vibrators, and other sources known to one of ordinary skill in the art. Marine seismic vibrators include boats or ships, trailers, submarine sources, subterranean sources, or other sources that can transfer unique vibratory signals to the earth or water. In one embodiment a reaction mass is vibrated at varying frequencies against the baseplate to produce vibratory motion (transmit vibration energy) which travels downward through any intervening water into the earth via the base plate. A survey may be designed that uses multiple energy sources, each being activated simultaneously so that the recording instruments capture a composite signal with contributions. The composite signal forms a record that may be either intentionally composite or separable through data inversion. A variety of programs are available to generate differing source patterns controlled in space, time, and frequency.

In vibroseis the seismic energy source is distributed over a period of time. This distribution of energy over time creates a distinct signal, such as a sweep, in which the signal changes systematically from low frequency at the beginning to high frequency at the end of the signal or visa-versa. Dependent upon the desired signal, number of vibroseis being conducted simultaneously, and transmission properties of the ground, different seismic sweeps may be developed. Computer processing of the seismic signals uses the distinct characteristics of the sweep to "collapse" the energy into short duration wavelets. ZENSEIS™ sources include vibroseis, seismic vibrator, and combinations thereof. Other multiple source seismic surveys include high fidelity vibratory seismic (HFVS), cascaded HFVS, combined HFVS, slipsweep, and the like.

Seismic sweeps include exciting at least two seismic sources for a period of 1 to 5 seconds, 2 to 30 seconds, or from 100 milliseconds to 12 seconds. Seismic sweeps may be less than approximately 100, 50, 25, 20, 15, 10, 9, 8, 7, 6, 5, 4, 3, 2, or 1 seconds. Sweeps may also be less than approximately 1000, 750, 500, 350, 250, 150, or 100 milliseconds. Sweeps may be independent, pulsed, gradient, or variable dependent upon the vibratory energy required.

Vibratory energy emitted by the seismic sources during each sweep can be encoded for source separation. Seismic sources are capable of emitting vibratory energy of controlled phase, frequency, and amplitude. In one embodiment, vibratory energy emitted by said seismic sources during each sweep can be phase encoded. Seismic sources include emission of vibratory energy from 1-150 Hz, 6-120 Hz, 1-60 Hz, 50-150 Hz, 1-80 Hz, 80-160 Hz and the like.

The power output of each seismic source can be 1-500, 15-250, or 20-100 bar·meters·sec. In one embodiment the cumulative power output of all seismic sources during each seismic sweep is less than 100, 25, or 10 bar·meters·sec or similar outputs.

"Simultaneous" sweeps are conducted by two or more seismic sources during overlapping periods of time. In contrast, synchronous sweeps are conducted by two or more seismic sources started and stopped at the same time. Using a starting pulse signal, computer control, or other coordinated methods, synchronized vibrators on a seismic survey may be started within milliseconds to generate a synchronous seismic signal. During synchronous seismic surveys the source vibrator frequency, phase, amplitude, and the like, may be synchronized to reduce interference, enhance signal, or otherwise enhance or modify the recorded data. Using a "simultaneous" sweep the source signals may have a "lag" either by design or unintentionally. In one embodiment, source signals are intentionally designed with a lag from 1 ms to 10 seconds wherein the lag allows independent signal encoding. In another embodiment, seismic sources are given one or more positions and time window but are operated independently. When the seismic sources are operated independently an arbitrary lag is created due to the asynchronous (or random) operation of the sources.

"Approximately" as defined herein is less than 20%, preferably less than 10%, most preferably less than 5% variation. Statistically, "approximately" may also be reflected in standard deviations, wherein approximately is defined as within 2 standard deviations, preferably within 1 standard deviations, and most preferably within 0.5 standard deviations of a given measurement.

The present invention provides a solution for imparting seismic energy from a number of sources and collected by a number of receivers while in continuous motion in the water wherein the energy reflected by subsurface structures may be more directly and easily resolved into coherently stacked output data. Two basic techniques are set forth in order to generate the pertinent data and to provide coherent output data of the subsurface structures.

Both techniques include several key aspects in the process of designing a marine survey with multiple sweep sources. For simplicity in design, the boat is preferably travelling at a substantially constant rate. Each vibrator or source should be spaced generally linearly in a streamer at a fixed and equal distance apart. For example, it may be desirable to space the sources 25 meters apart on a common streamer. The shot points or points where each sweep is initiated should be approximately at the same spacing along the travel path of the boat. The receivers should all be spaced from one another by approximately the same spacing. It should be noted that the exact spacing between the last source or vibe and the first receiver is much less critical than the spacing between like items. It should also be recognized that a multiple source sweep seismic survey in a marine environment may be conducted using the present invention to conduct both and either two dimensional surveys and three dimensional surveys. In a three dimensional survey, at least two streamers are arranged to be laterally spaced apart from one another so that seismic energy from the vibes is collected laterally away from the streamer that immediately follows the vibes. Again, these aspects are common for the two techniques that are to be described. It should be understood that the basic concepts of these two techniques may be used by other techniques and that slight modification of either or both of these techniques is intended to be within the scope of the claims that follow this specification.

Figure 2:
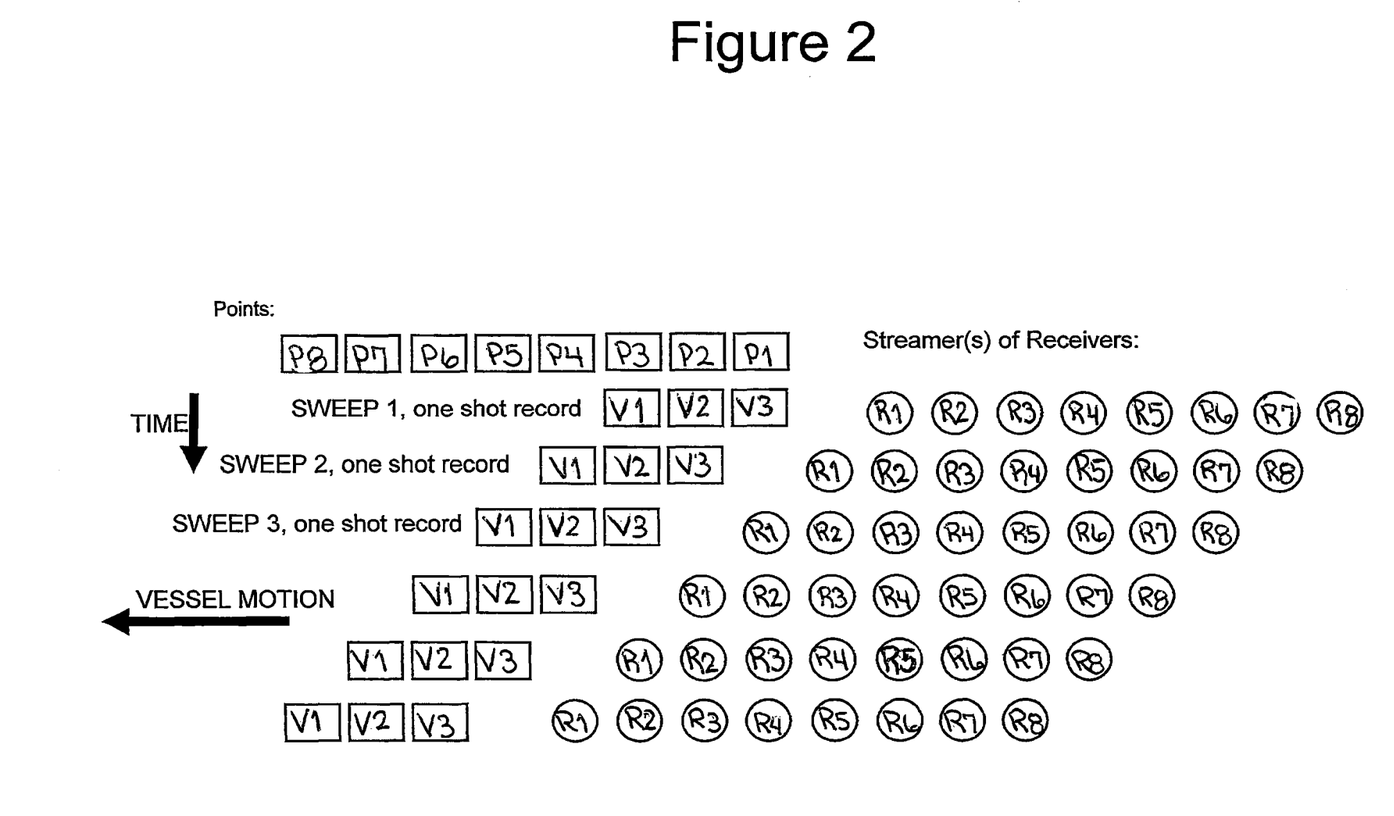
FIG. 2 is a comparable representation of a marine acquisition system where three vibrators are operating with three sweeps and a streamer of eight receivers trail behind the vibrators where each successive line showing the vibes and receivers are shown to have moved to the left following the boat where a later sweep is initiated.

The first example embodiment of the invention is a technique that comprises an inversion process that separates the multitude of signals received by all of the receivers and identifying the specific signals for summing for each point in the survey from source receiver pairs that essentially "saw" the same ray path for the energy descending and returning from the substructures. With three or more paired signals, the particular reflections provide a clearer image of the substructures. In order to separate the signal from the particular source, the signal must be unique as many other signals are being emitted concurrently and the receiver must be separately identified by the recorder. Separable signals are obtained by phase encoding and by frequency shifting. Each separable source/receiver paired signal has a common midpoint centered horizontally between the source and receiver. For example, in FIG. 2, Source V1 and Receiver R1 may together form a first source/receiver pair at a midpoint essentially halfway between the two. With common spacing between all sources in a string and all receivers in the string following the sources, a signal that Source V2 emits and Receiver R2 collects during the second sweep may overlie the same midpoint. Stacking these two source-receiver signals when aligned for their time and movement provides a sharper image of the subsurface structure than either provides independently. Stacking the signals from three source-receiver pairs where all three are aligned provides a more clear image.

Part of the invention is to use marine sources that emit a sweep signal having lower power to reduce impacts on marine life. However, due to this lower power output, stacking of the data is necessary to resolve reasonable images of subsurface structures. Stacking data from multiple continuously sweeping sources that are moving with multiple moving receivers present considerable complication.

Figure 1:
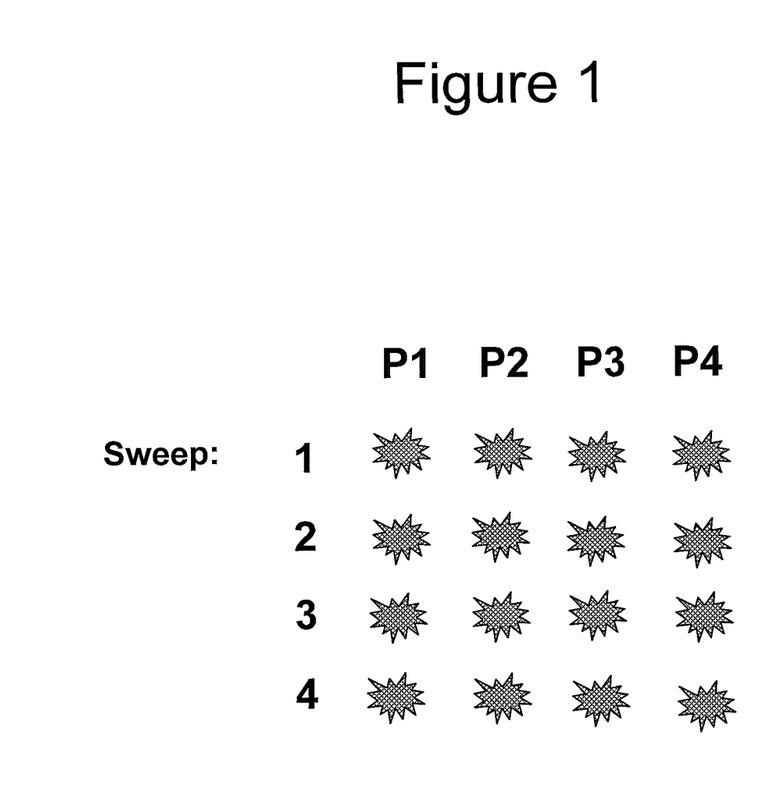
FIG. 1 is a representation of a land acquisition system with four vibrators operating with four sweeps.

The first technique to create stacked data is to separate the signals received by each receiver so that the signals from each source, each receiver and each sweep are identified and separated. For a better understanding, it should be first recognized that in a land survey, all of the sources remain at fixed locations during the sweep. That is generally illustrated in FIG. 1. However, as is portrayed in FIG. 2, a boat may move right to left while towing three vibes noted as V1, V2 and V3 and eight Receivers, R1, R2 R3, R4, R5, R6, R7 and R8. As Vibe V1 gets to each of the respective points P1 through P9, a start of sweep is initiated. It should be explained that in another embodiment of the invention, the vibes are continuously sweeping such that the duration of each sweep and the timing when the first vibe reaches each position P1 to P9 are similar thus the signals emitting from the vibes are continuous and the survey time is further compressed. For explanation purposes for the second embodiment, one should assume a discrete start and stop for the sweeps. Three sweeps are labeled and stacked on one another in the Figure where the first sweep, SWEEP 1 begins when V1 is at P3. Note that V2 is at P2 and V3 is at P1. The sweep is complete before V1 gets to P4 where another sweep commences, this second sweep being labeled SWEEP 2. Again, the second sweep is completed and the boat is moving at a substantially constant velocity pulling the first vibe, V1 to P5 where a third sweep, SWEEP 3 commences. Note that during the third sweep, the third vibe V3 is in substantially the same position as V1 was in during the first sweep and the third receiver is in substantially the same position during the third sweep as the first receiver was during the first sweep. This common geometry, along with phase encoded signals for separating the signals received by each receiver into its constituent sources is required to make the inversion process look like a fixed process where the source and receiver were not moving. This allows the inversion process to run conventionally.

Figure 3:
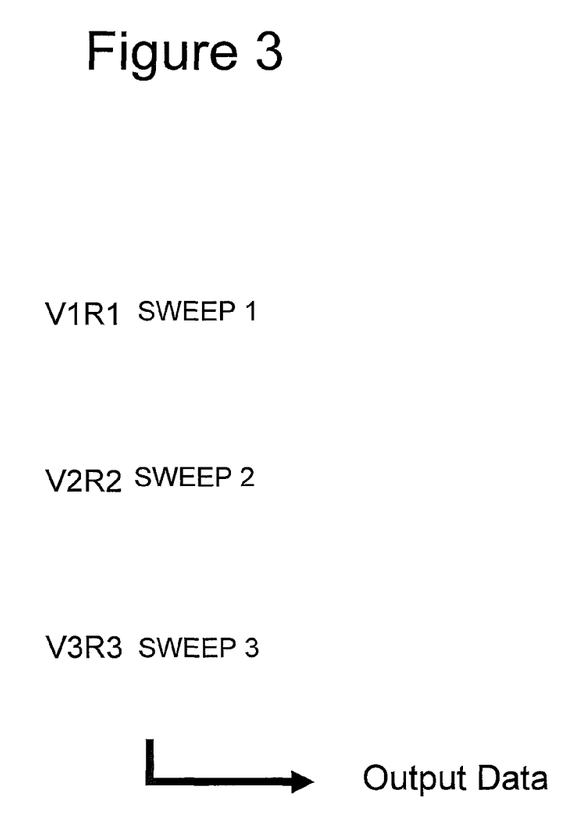
FIG. 3 shows selected traces at Point 3 that are separated and summed to generate the output data

Thus, the key for the first technique is to separate and identify the respective source receiver pairs for each sweep at the respective shot points and combine only those source receiver signals that substantially line up with each shot point. In FIG. 3, for example the source receiver pair where the signal from Vibe 1 was received by Receiver 1 is labeled "V1R1". This process provides well defined images but extracting each individual signal from each source from each sweep and collating them for such stacking at each common mid point for a survey that extends over many square miles requires significant computer resources and time.

Figure 5:
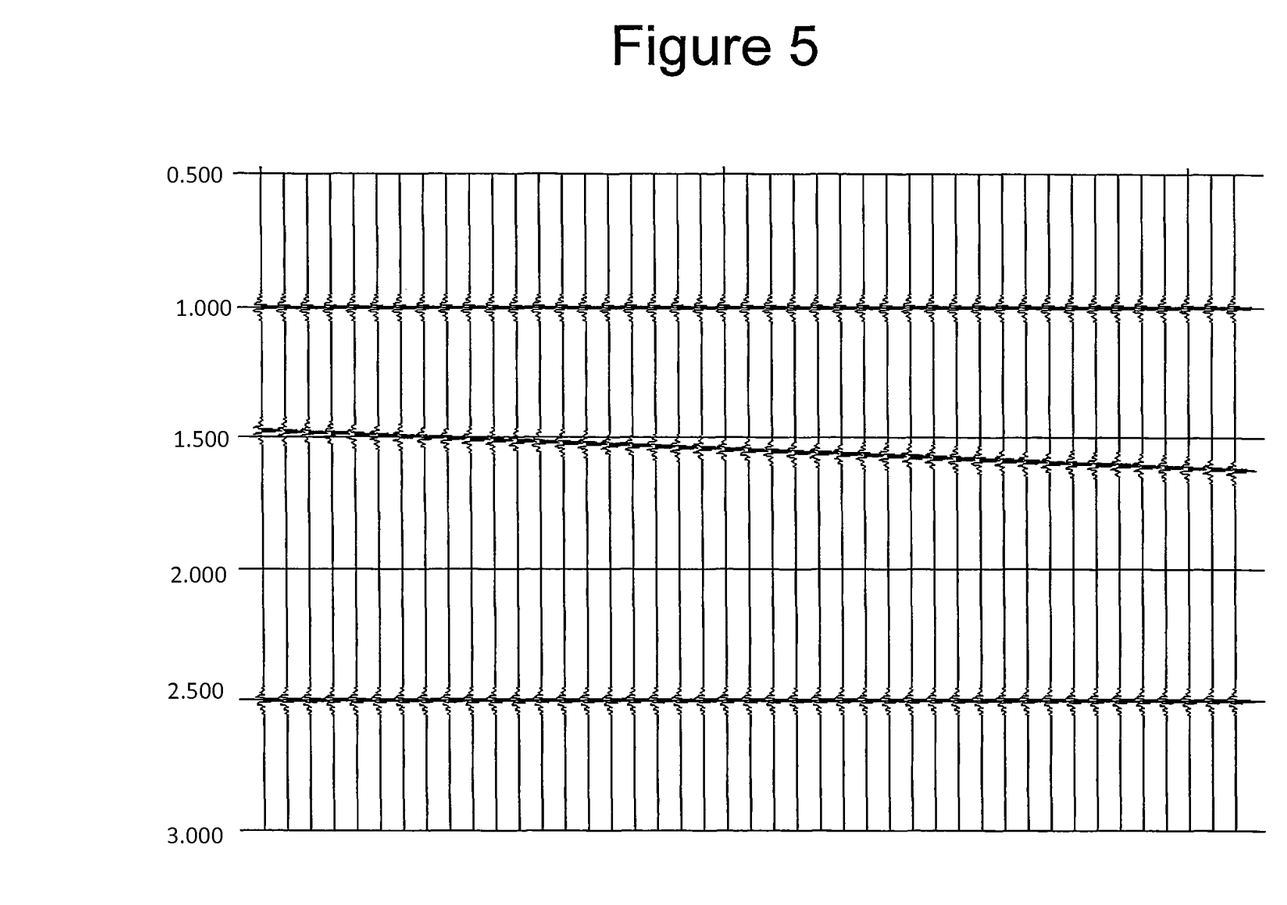
FIG. 5 shows a synthetic contour for which data may be created and analyzed.
Figure 6:
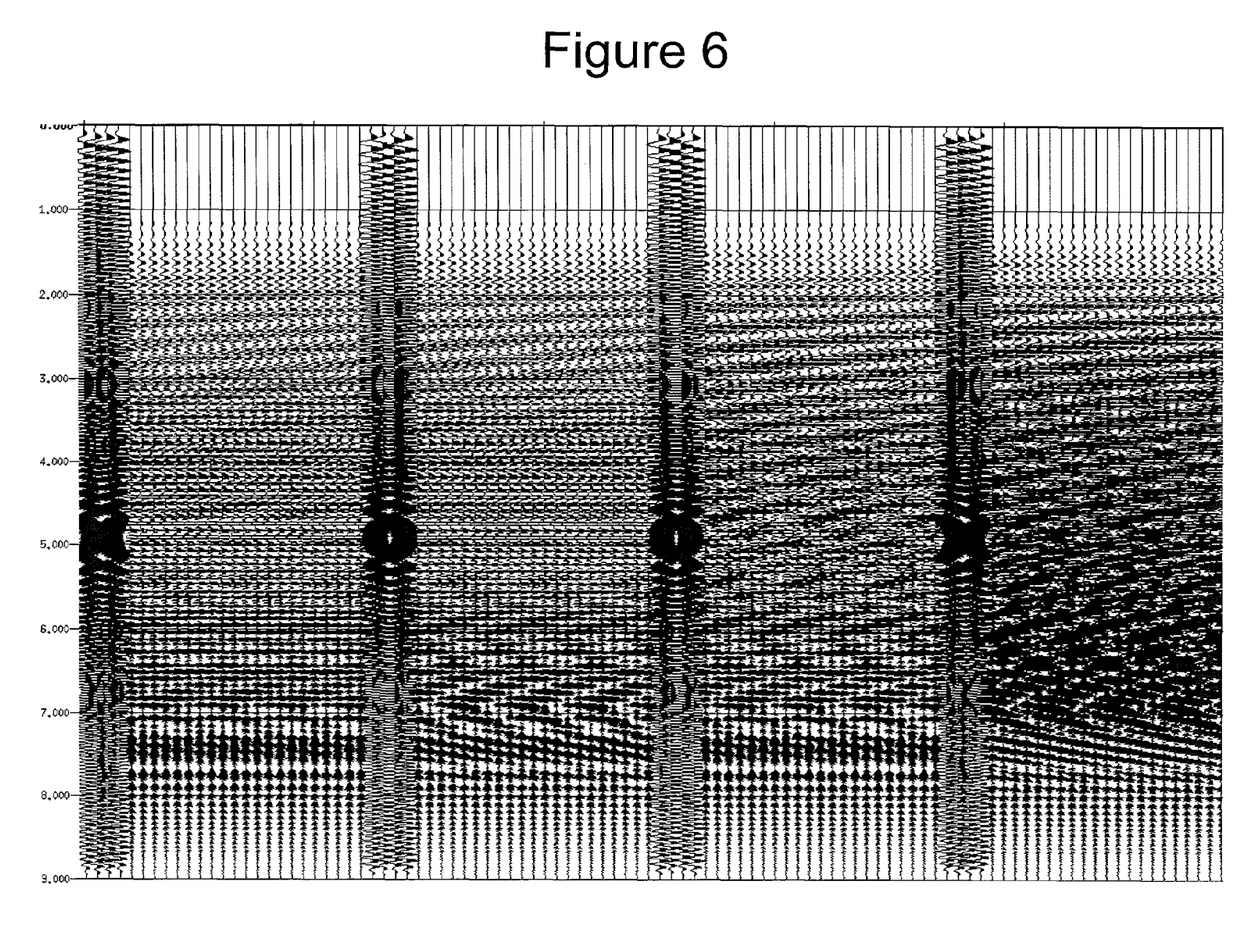
FIG. 6 shows how the raw data would appear from four sweeps of four vibrators also known as vibes and four receivers based on moving sweep sources and moving receivers for the synthetic contours.

Turning to FIG. 5, a model for testing the prospective method was created to have three reflective substructures. The highest and lowest substructures are relatively flat while the intermediate substructure is angled slightly with respect to level for higher certainty of determining the method to be valid. FIG. 6 shows the calculated raw reflective data from the synthetic structure model of FIG. 5 using four vibes and four sweeps. It is clearly an undecipherable mess with four vibes emitting signals at the same time. The four sweeps are clearly visible where the high energy signals are recorded at the top of the chart indicating that they are sensed at the beginning of the sweep. The signals lower on the page result from longer delays in receiving those signals from the substructure. However, by processing the raw signals to separate the individual source signals or shot records at each shot point, it can be seen in FIG. 7 what each receiver receives from the respective source in the respective sweep. Four shot records are shown left to right showing how the vessel had moved from position 1 to 4 during acquisition.

Figure 4:
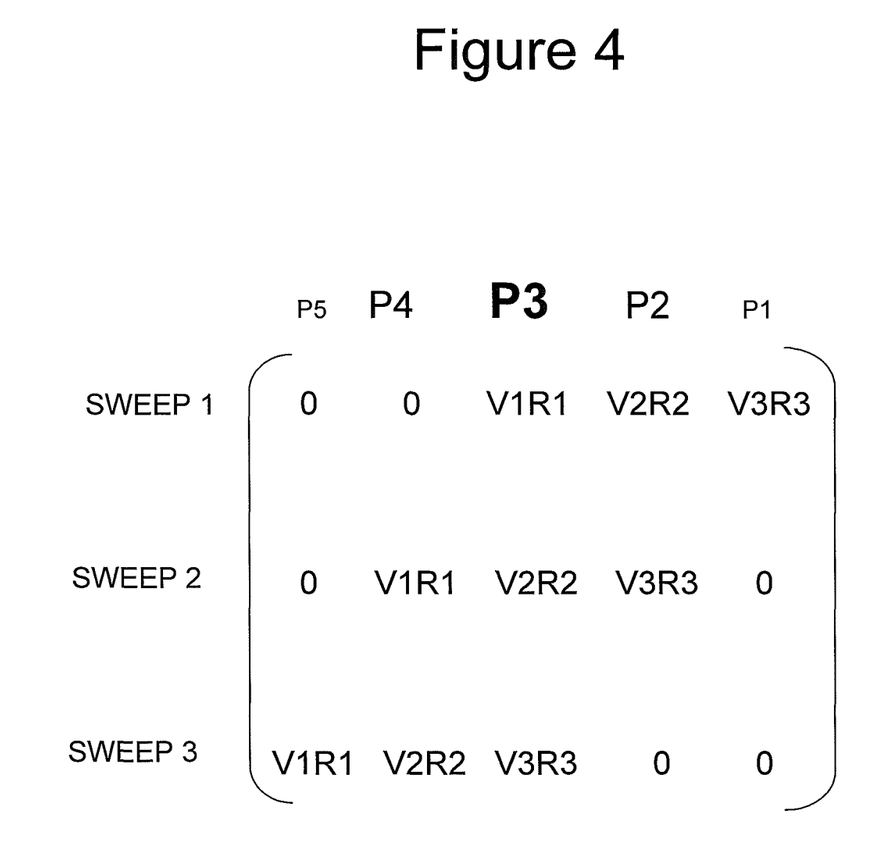
FIG. 4 shows a matrix used for quickly generating output data for Point 3 where the signals have been separated and a least-squares or similar matrix solution is resolved for Point 3 and output data is generated for the other points using a similarly created matrix.

The second embodiment of the invention does not require the effort for signal selection as the first technique. In the second technique, the signals are separated every sweep and used to populate a matrix such as shown in FIG. 4. Actually, the matrix of data is much larger than what is shown in FIG. 4, but the matrix is resolved using least-squares or similar matrix solution type regression analysis where solutions for three sweeps are calculated for five data points P1 through P5. However, the solution for P3 is saved and the other solutions are eliminated. The data in the matrix not in the middle column does provide a small amount of imprecision to the signal at P3, but it does not appear to detract from further processing and analysis. To the extent that it is seen in the output data, the respective reflections are perhaps a little blurry, but follow the shape and return time that is resolved from the first method. The advantage of this second method is that successive points may be resolved by solving successive matrices that are one row down and one column over for the next point. Thus, for P4, the row labeled SWEEP 1 would be dropped and a SWEEP 4 row would be added to the bottom of the matrix. At the same time, the columns processed would extend from P2 to P6 where P4 would have non-zero signals from top to bottom. Such a procedure may be accomplished in real time by currently available technology using linear array processors or by a hard-wired, made for purpose, computer system so that an operator may see that the data that is being collected is resolvable into useful output data. If a source is malfunctioning, data collection is likely a waste of time and the sooner such malfunctioning equipment is fixed or replaced, much time and money may be saved.

Figure 7:
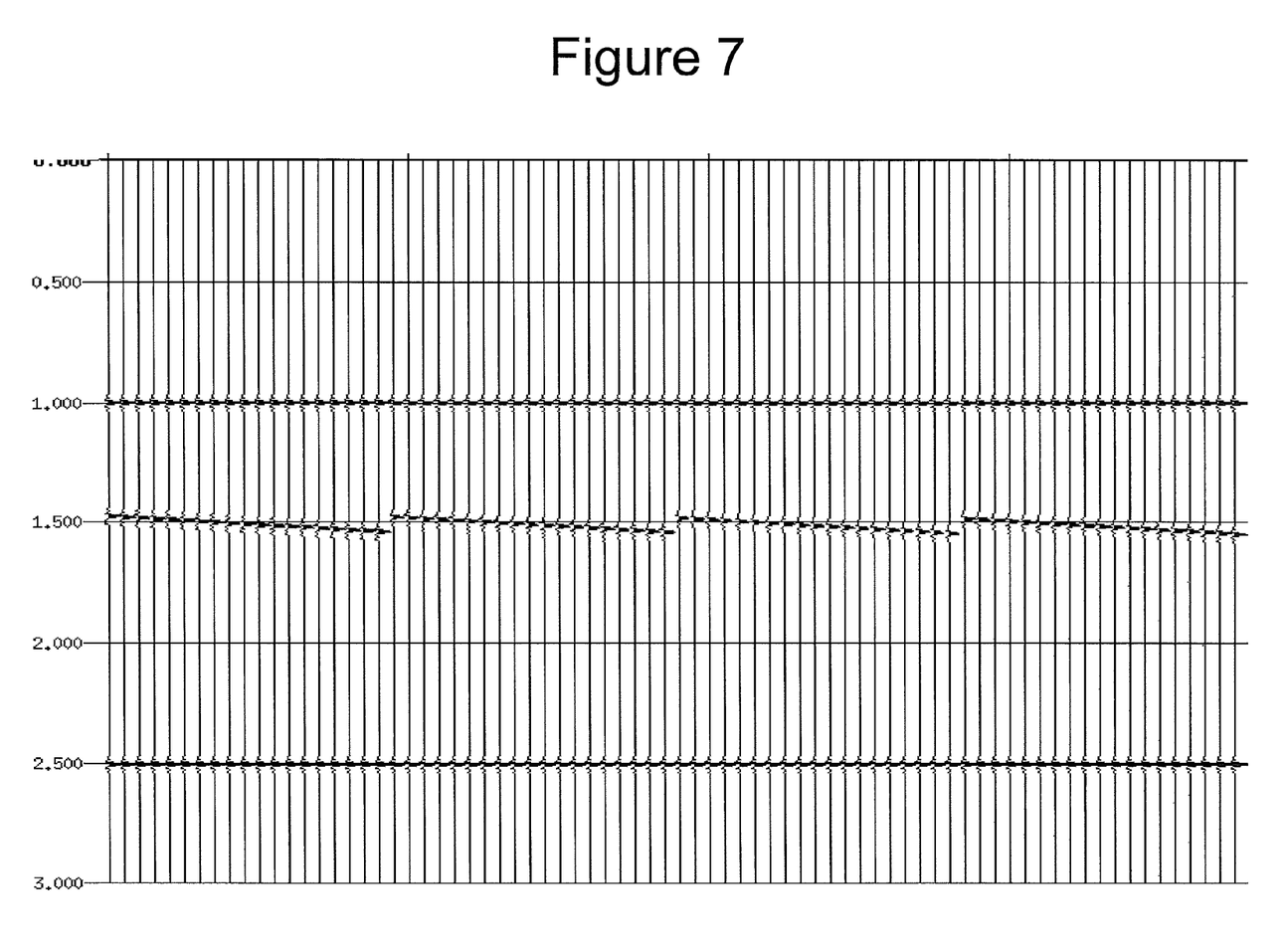
FIG. 7 shows the output data from the first method of resolving translating multiple sources and receivers in a sweep seismic survey for each of the four individual shot points. Thus the technique recovers the model shown in FIG. 5 correctly.

As shown in FIG. 5-7, when comparing a multiple vibratory source seismic system to conventional acquisition as an example, there are approximately 1 million traces/km sq, or about 10 fold more coverage than with a conventional seismic acquisition. For simultaneous-multiple-source there are 1326 shot/km sq with 670 rcr/km sq, while conventional has only 126 shot/km sq for 100-200 rcr/km sq. The cost savings is substantial because simultaneous-multiple-source costs 10% more than a conventional seismic survey. However, the coverage for simultaneous-multiple-source is over 10 fold greater, there is only an incremental cost increase to achieve the resolution and accuracy of an SMS survey.

Again, sweeps are inverted in sets of 3 or more to increase the amount of single source data. In one embodiment, sweeps 1-3 are analyzed first, sweeps 2-4 are analyzed second; in progression until the last sweep is analyzed (sweeps (N−2)–N). The sweeps need not be analyzed in identical sets and one set of sweeps may be sweeps 1-3 while the next set is sweeps 2-5. In this way, combining multiple sweeps and analyzing them independent of other sweeps acquired during the survey, increases the amount quality single source data exponentially and a greater area may be analyzed for each seismic survey. Typically, a receiver cable contains 100's or 1000's of channels. As receiver costs decrease, the number of receivers used is constantly increased. The receivers are analyzed iteratively in sets of 3 or more receivers to generate 1 set of data for each pair. Thus receivers 1, 2, and 3 are used to generate source/receiver data for channel 2; receivers 2, 3, and 4 are used to generate source/receiver data for channel 3; until a dataset is available for the survey area. Not all data must be incorporated into the matrix and data with increased coverage may be selected to obtain a more accurate assessment of the covered area.

The number of sweeps must be equal or greater than the number of sources to obtain quality data and have sufficient coverage to invert and separate the individual sources. Thus a survey with 4 sources must have a minimum of 4 sweeps, a survey with 5 sources must have a minimum of 5 sweeps, and a survey with N sources must have a minimum of N sweeps. Additional sweeps may be incorporated without limitation.

A computer code was written using synthetic data that demonstrated separation of marine data from moving vibratory sources and receivers.

Recorded data may contain multiple datasets with the same source/receiver midpoint (SRM). SRM data is grouped prior to the inversion algorithm. The inversion algorithm typically uses 3 or more receiver sets for inversion. Inverted data are analyzed for quality and clarity; SRM data may be added or removed to improve inverted data quality. Sometimes the recorded data and often the inverted data are weighted dependent upon source/receiver location and signal quality to improve the inverted data. Finally, separate inverted data are generated for each source.

As mentioned above, the present invention was described primarily related to two dimensional surveys. A three dimensional survey may also be conducted in a marine environment where the data is stacked in a comparable manner using signals from successive sweeps by source-receiver pairs that were at comparable locations during the successive sweeps that are combined to produced robust output data. Three dimensional marine surveys are accomplished by having multiple streamers laterally offset from one another so that data is collected having signal paths that are lateral angles to the signal paths for receivers on other streamers.

Although the systems and processes described herein have been described in detail, it should be understood that various changes, substitutions, and alterations can be made without departing from the spirit and scope of the invention as defined by the following claims.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Ser. No. 61/109,403 (Chiu, et. al.) "Marine-High Fidelity Vibratory Seismic Acquisition" (Oct. 29, 2008).
2. U.S. Ser. No. 12/167,683 (Brewer and Eick) "Marine Seismic Acquisition with Controlled Streamer Flaring" (Jul. 3, 2008)
3. U.S. Pat. No. 4,715,020 (Western Atlas Int.) "Simultaneous performance of multiple seismic vibratory surveys" (Feb. 22, 1987)
4. U.S. Pat. No. 5,719,821 (Sallas, et al.) "Method and apparatus for source separation of seismic vibratory signals" (Feb. 17, 1998).
5. U.S. Pat. No. 5,721,710 (Sallas, et al.) "High fidelity vibratory source seismic method with source separation" (Feb. 24, 1998).
6. U.S. Pat. No. 6,028,818 (Schlumberger Tech. Corp.) "Method and Apparatus for Multiple Seismic Vibratory Surveys" (Feb. 22, 2000)
7. U.S. Pat. No. 6,049,507 (Mobil Oil Corp.) Method and Apparatus for Correcting Effects of Ship Motion in Marine Seismology Measurements (Apt. 11, 2000)
8. U.S. Pat. No. 6,161,076 (Baker Hughes Inc.) "Seismic data acquisition and processing using non-linear distortion in a vibratory output signal" (Dec. 12, 2000).
9. U.S. Pat. No. 6,545,944 (WesternGeco, L.L.C.) "Method for Acquiring and Processing of Data from Two or More Simultaneously Fired Sources" (Apr. 8, 2003).
10. U.S. Pat. No. 6,754,590 (WesternGeco, L.L.C.) "Seismic surveying method" (Jun. 22, 2004).
11. U.S. Pat. No. 7,295,490 (ConocoPhillips Company) "System and Method of Phase Encoding for High Fidelity Vibratory Seismic Data" Chiu, Eick, and Emmons. (Dec. 13, 2007)
12. US2006164916 (Exxon Mobil Upstream Research Co.) "Method for Continuous Sweeping and Separation of Multiple Seismic Vibrators" (Jul. 27, 2006).

The invention claimed is:

1. A method of recording multiple marine seismic signals comprising:
    a) deploying two or more independent phase encoded vibrational seismic sources, and three or more seismic receivers spaced the same substantially common distance from one another into the water to be towed by a boat;
    b) while in motion, transmitting multiple simultaneous sweep signals from the independent phase encoded seismic sources;
    c) while in motion, recording multiple simultaneous phase encoded seismic signals (b);
    d) inverting the recorded seismic signals in (c);
    e) separating signals at each receiver into separate source specific signals; and
    f) taking the source-receiver pair signals and stacking them based on a substantially common location of the respective sources and receivers at the time of the respective sweep so as to correct for the motion of the sources, receivers and common mid points.

2. The method according to claim 1, wherein said independent phase encoded seismic sources include ZENSEIS™ seismic, vibroseis, seismic vibrators, high fidelity vibratory seismic (HFVS), cascaded HFVS, combined HFVS, slipsweep, and combinations thereof, said sources being operated independently without coordinated synchronized signals.

3. The method according to claim 2 wherein the sources are spaced at a substantially common distance from one another and the points at which the sweeps are initiated are spaced at the same substantially common distance from one another.

4. The method according to claim 1 wherein two or more streamers of receivers are laterally offset from one another to acquire three dimensional seismic data.

* * * * *